United States Patent [19]

Shigeta et al.

[11] Patent Number: 5,245,168
[45] Date of Patent: Sep. 14, 1993

[54] METHOD FOR CONTROLLING BAR CODE READING IN BAR CODE READER

[75] Inventors: Satoshi Shigeta; Hirokazu Suga, both of Tokyo, Japan

[73] Assignee: Nippon Electric Industry Co., Ltd., Tokyo, Japan

[21] Appl. No.: 792,543

[22] Filed: Nov. 15, 1991

[30] Foreign Application Priority Data

Jun. 20, 1991 [JP] Japan .................. 3-174840

[51] Int. Cl.$^5$ .............................. G06K 7/10
[52] U.S. Cl. ........................ 235/462; 235/466; 235/472
[58] Field of Search .......... 235/462, 466, 472

[56] References Cited

U.S. PATENT DOCUMENTS

| | | | |
|---|---|---|---|
| 3,796,862 | 3/1974 | Asija | 235/462 |
| 4,140,271 | 2/1979 | Nojiri et al. | 235/456 |
| 4,232,216 | 11/1980 | Helle | 235/462 |
| 4,656,345 | 4/1987 | Kurimoto | 235/455 |
| 4,680,457 | 7/1987 | Robertson | 235/463 |
| 4,806,741 | 2/1985 | Robertson | 235/462 |
| 5,135,160 | 8/1992 | Tasaki | 235/462 |

Primary Examiner—Carolyn E. Fields
Assistant Examiner—Drew A. Dunn
Attorney, Agent, or Firm—Jordan and Hamburg

[57] ABSTRACT

A method for controlling bar code reading, by which a CCD shift pulse signal and a LED control signal are delivered from a bar code reading control circuit comprising a multiplexer, a counter, two monostable multivibrators and a plurality of logic circuits or a CPU provided with an ROM in which a bar code reading program is stored and a logic unit, the on time of a light emitting diode (LED) which projects a light onto the bar code and the time of bar code information input by a charge coupled device (CCD) are shortened for supplying a bar code signal to the CCD, while the time of bar code reading out by the CCD is lengthened for delivering the bar code information as analog signal from the CCD.

3 Claims, 6 Drawing Sheets

METHOD FOR CONTROLLING BAR CODE READING IN BAR CODE READER

BACKGROUND OF THE INVENTION

1. Field of the Invention

The present invention relates to an improved method for controlling the bar code reading in a bar code reader.

2. Description of the Prior Art

In a conventional method for controlling bar code reading, a signal for controlling the turn-on of a light emitting diode (LED) which projects a light onto a bar code surface and a shift pulse signal for driving a charge coupled device (CCD) which receives reflected light from the bar code surface and reads information represented by the bar code are delivered simultaneously to provide a correspondence between the LED-on time for which the bar code is read and the time (CCD photo-detection time) during which the CCD receives the reflected light from the bar code surface, as shown in FIG. 5. Also, the time during which the bar code information read for the CCD photo-detection time (LED-on time) is delivered as an analog signal is so controlled as to be the same as the time for which the bar code information is supplied to the CCD.

A circuit which generates the above-mentioned two control signals is shown in FIG. 6.

As seen in FIG. 6, a counter 101 provided with a counter reset control unit 102 is supplied with a clock signal and an output signal divided in frequency in the counter 101 is delivered to the counter reset control unit 102 and two monostable multivibrators 103 and 104.

The above-mentioned monostable multivibrator 103 delivers a square-wave shift pulse signal which drives the CCD (namely, CCD shift pulse signal). This square wave signal is supplied via flip-flop 105 to one of the input terminals of an AND circuit 106. A square-wave signal delivered from the above-mentioned monostable multivibrator 104 is supplied to the other input terminal of the AND circuit 106 where it is ANDed with the output signal from the flip-flop 105 to produce a control signal. This control signal, that is, a logical product, is delivered from the AND circuit 106 to drive the LED.

For the correct reading of bar code information marked on the surface of a commodity, it is necessary to lengthen the LED-on time (CCD photo-detection time) to some extent.

However, the lengthening of the CCD photo-detection time will cause a possibility that the CCD is likely to be adversely affected by a disturbing light incident for this time, so that an error takes place in a bar code information read by the CCD due to the incident disturbing light or an error occurs in the bar code information supplied to the CCD due to the lateral oscillation caused during reading of the bar code, possibly delivering an incorrect information.

SUMMARY OF THE INVENTION

The present invention has an object to overcome the above-mentioned drawbacks of the conventional techniques by providing a method for controlling the bar code reading, by which the accuracy of the bar code reading of the same level as that in the conventional bar code reading can be read with less influence of the disturbing light and with less possibility of the bar code information incurring an error caused by the lateral oscillation during reading.

The above-mentioned object of the present invention is attained by providing a method for controlling the bar code reading, wherein a clock signal is so converted that signals of which the delivery intervals are changed alternately are delivered as shift pulse signals which drive the CCD. Also in this method, a signal synchronous with the one among the above-mentioned shift pulse signals that is delivered at the short interval is picked up from among the above-mentioned clock signals and delivered as the control signal to drive the LED.

The controlling the bar code reading by method according to the present invention is done with the above-mentioned two control signals as in the following. That is, in the process of supplying a bar code information to the CCD, a control signal to control the LED and a shift pulse signal to drive the CCD which reads the bar code information are delivered synchronously with each other and the LED-on time and interval of shift-pulse signal delivery to the CCD are shortened, while in the process of delivering the bar code information from the CCD, the interval of shift-pulse signal delivery to the CCD is lengthened.

Also, to embody the method according to the present invention, a CPU is associated with an two timers which deliver an LED control signal and CCD shift pulse signal, respectively, and a ROM which stores a bar code reading program. When a bar code is read by means of a logic unit, a clock signal is supplied to these two timers. Thus, the bar code reading unit of the bar code reader can be designed lightweight and compact. Furthermore, by changing the program stored in the ROM built in the CPU, the bar code reading can be correctly and rapidly controlled in correspondence with to the environmental conditions.

DETAILED DESCRIPTION OF THE PREFERRED EMBODIMENT

Figure 1:
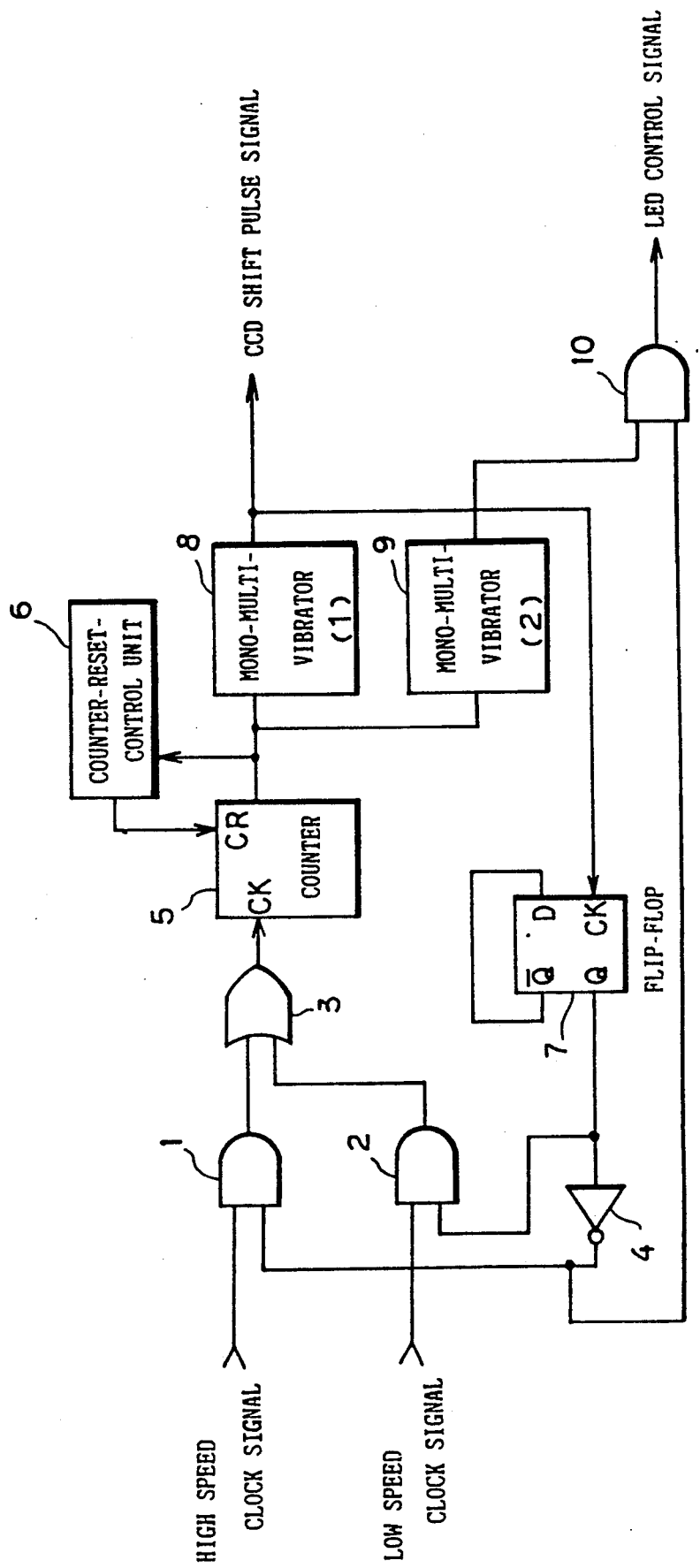
FIG. 1 is a block diagram showing the control circuit for implementing the method for controlling the bar code reading according to the present invention.

Referring now to the block diagram showing the configuration of the control circuit which implements the method for controlling the bar code reading according to the present invention as shown in FIG. 1, a two-input multiplexer comprises two AND circuits 1 and 2, OR circuit 3 and a NOT circuit 4. A high speed clock signal is supplied to one of the input terminals of the AND circuit 1, while a low speed clock signal is supplied to one of the input terminals of the AND circuit 2. A shift signal for the multiplexer is supplied to the multiplexer via a flip-flop 7 from the output terminal of a monostable multivibrator 8 which delivers a CCD shift pulse.

The high and low speed clock signals supplied to the multiplexer are delivered alternately from the OR circuit 3 to the clock terminal of a counter 5 having a counter reset control unit 6. In the counter 5, the input signal is divided in frequency by, for example, 2048 and this frequency-divided signal is delivered to the counter reset control unit 6 which resets the zero point of the counter 5 as well as to two monostable multivibrators 8 and 9.

A square-wave signal delivered from the monostable multivibrator 8 is a shift pulse signal produced based on the high and low speed clock signals divided in frequency in the counter 5 and of which the delivery interval changes alternately.

The output signal from the monostable multivibrator 9 and that from the NOT circuit 4 in the two-input multiplexer are ANDed in the AND circuit 10, and the resultant logical product is delivered from the AND circuit 10 as LED-on time control signal which drives the LED.

The method for controlling the LED which illuminates the bar code surface and the method for controlling the CCD which reads the bar code information and delivers it as an analog signal will now be explained with reference to FIGS. 1 and 4.

The high and low speed clock signals supplied to the AND circuits 1 and 2 in the two-input multiplexer are supplied alternately to the counter 5 from the OR circuit 3. The counter 5 delivers an output pulse signal derived from the frequency division by 2048 and which is delivered alternately at long and short intervals.

Therefore, the CCD shift pulse from the monostable multivibrator 8 is a square-wave pulse synchronous with the counter output pulse. Also the LED control signal delivered from the AND circuit 10 turns on synchronously with the rise of the CCD shift pulse originated from the low speed clock signal, and turns off at the rise of the CCD shift pulse signal originated from the high speed clock signal. Namely, since the on time of the LED control signal corresponds to the short one among the CCD shift pulse signal delivery intervals, the LED on time coincides with the time of bar code reading by the CCD.

Figure 4:
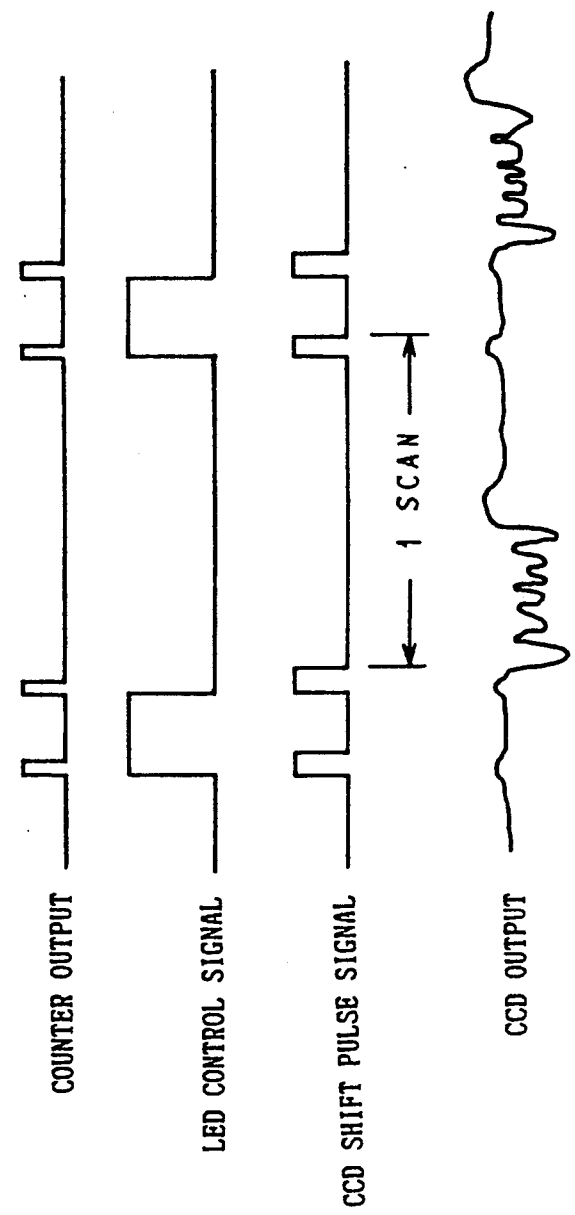
FIG. 4 shows the waveforms of the control signals in the present invention.
Figure 5:
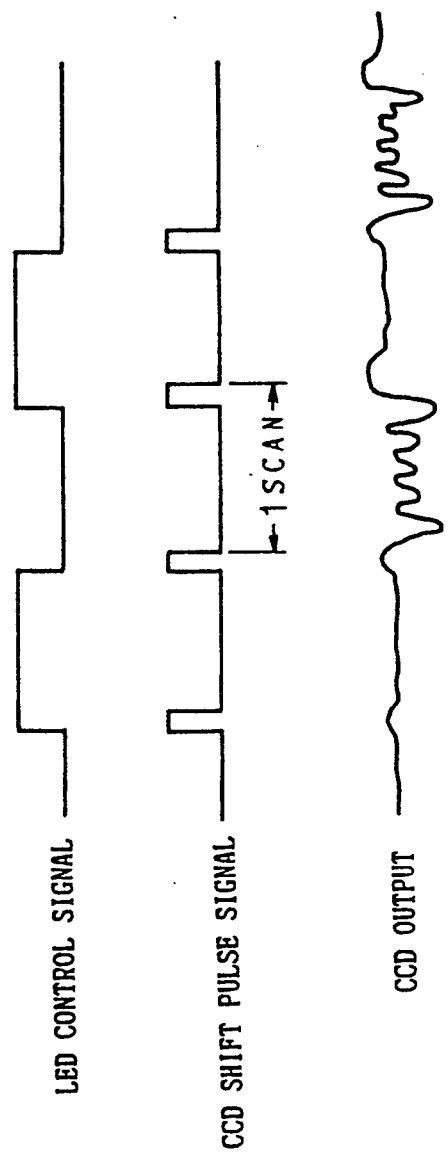
FIG. 5 shows the waveforms of the control signals in a conventional technique of controlling the bar code reading.
Figure 6:
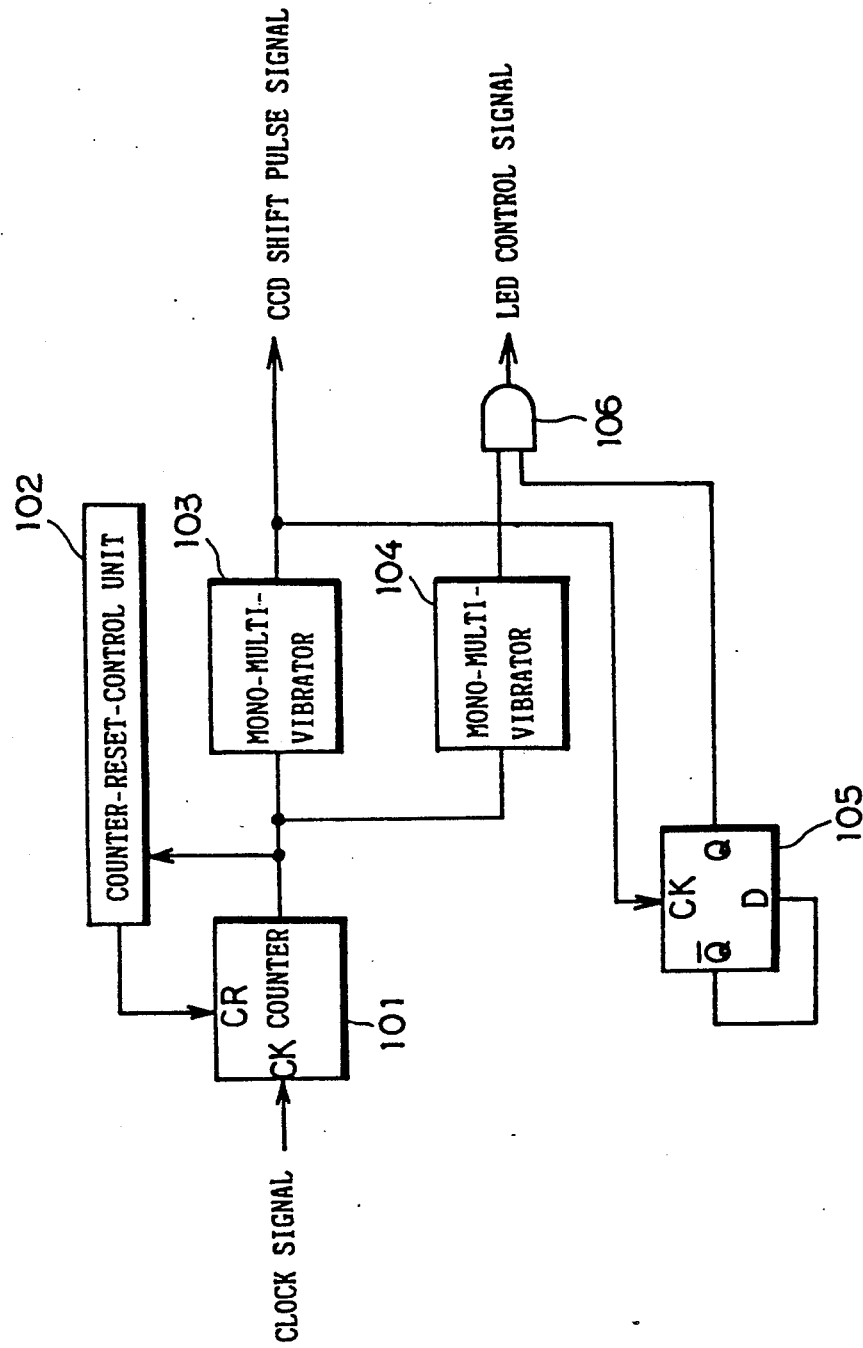
FIG. 6 is a block diagram showing the configuration of the conventional bar code reading control circuit.

As, shown in FIG. 4, the bar code information read by the CCD is delivered as delayed one scan as an analog signal. This delivery time depends upon the delivery interval of the output pulse from the counter that is based on the low speed clock signal, and it has a same time length as in the conventional bar code reading.

Note that since the LED-on time is shorter than ever, the LED illuminance is so increased that the amount of light onto the CCD is the same as in the conventional bar code reading.

Figure 2:
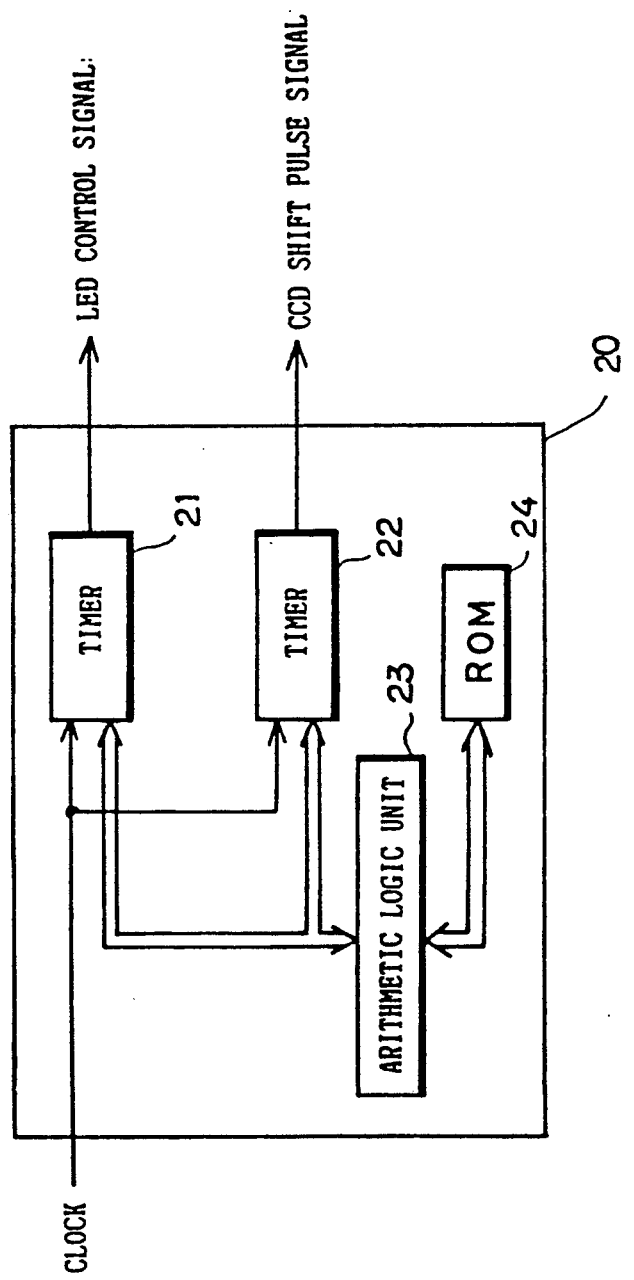
FIG. 2 is a block diagram showing the CPU circuitry for implementing the method for controlling the bar code reading according to the present invention.

FIG. 2 shows another embodiment of the method for controlling the bar code reading according to the present invention, which uses a CPU.

As shown in FIG. 2, a clock signal is supplied to two timers 21 and 22 incorporated in a CPU 20.

The timer 21 delivers an LED control signal, while the timer 22 delivers a CCD shift pulse signal. These control signals are controlled by a logic unit 23 under a bar code reading program stored in an ROM 24. The CPU 20 delivers the LED control signal and CCD shift pulse signal as shown in the flow chart in FIG. 3.

Figure 3:
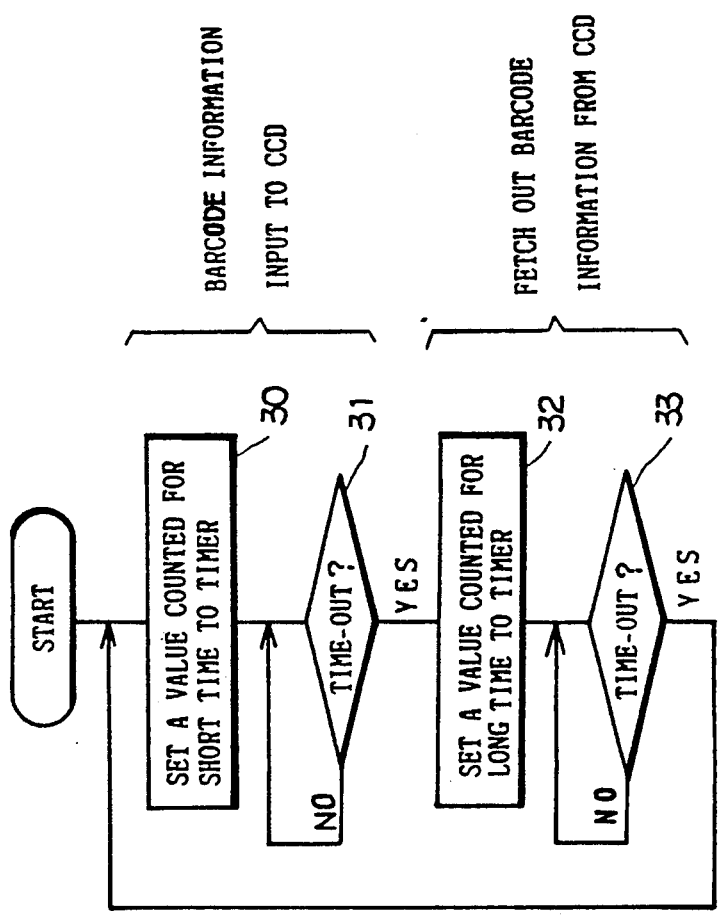
FIG. 3 is a flow chart of program run by the CPU shown in FIG. 2.

As shown in FIG. 3, a count for the short delivery interval is set in the timers 21 and 22 in FIG. 2 (at step 30), and a bar code information is supplied to the CCD for a time until the time-out point (at step 31).

When a predetermined time passes, it is judged whether the time-out point has been reached or not (at step 31). If the time-out point has been reached, a count for the long delivery interval is set in the timer 22 (at step 32) and a bar code information having been read by the CCD for a time until the time-out point is delivered as analog signal.

Namely, a similar function to the method for controlling the bar code reading, having been explained in reference to FIG. 1, is implemented by the CCD.

As having been described in the foregoing, the method for controlling the bar code reading according to the present invention is to deliver an LED-on control signal which drives the LED which projects a light onto a bar code surface and a shift pulse signal which drives a CCD which receives a reflected light from the bar code surface and reads the bar code information, synchronously with each other, the LED-on time and delivery interval of CCD shift pulse signal being shortened when the bar code information is supplied to the CCD, while the bar code read signals are delivered at longer intervals when the read bar code information is delivered as analog signal from the CCD.

Therefore, since the LED-on time and CCD read time are so short that the bar code reading is not likely to be influenced by the disturbing light, the bar code information can be read accurately even in any bad ambient conditions. Further, since any error is not likely to take place due to the lateral deflection of the reader when scanning a bar code, the read speed can be increased.

Moreover, since it is possible to add a function of bar code read control to CPU, the bar code read control unit can be designed compact and lightweight, and a bar code reading suitably effectable in any ambient conditions can be realized by changing the bar code reading program stored in the ROM.

What is claimed is:

1. A method for controlling bar code reading in a bar code reader including a light emitting diode (LED) which projects a light onto a bar code printed on the surface of a commodity and a charge coupled device (CCD) which receives the reflected light from the bar code and delivers the read bar code information as an analog signal, comprising;
   generating first and second shift pulse signals having first and second alternate delivery intervals, respectively, for driving said CCD, said first interval being shorter than said second interval;
   generating a control signal for driving said LED synchronously with said first shift pulse signal;
   delivering said first shift pulse signal and said control signal synchronously with said first shift pulse signal to said LED for reading bar code information from the bar code; and
   delivering said second shift pulse signal during the process of reading out the read bar code information as an analog signal.

2. A method as set forth in claim 1, comprising;
   storing a reading control program in a memory means for controlling a process of optically illuminating a bar code and reading bar code information from said bar code, and storing a program for outputting the read bar code information as an analog signal in said memory means;

delivering a train of signals with a timing means for driving said LED and CCD for predetermined lengths of time, respectively, in accordance with said control program stored on said memory means; and controlling both said memory means and timing means with a logical calculating means.

3. A method as set forth in claim 2, wherein said timing means has first and second timers, comprising driving said CCD and LED with said first and second timers, respectively, with said bar code reading control program, to set said first and second intervals.

* * * * *